United States Patent
Zhang et al.

(10) Patent No.: US 11,218,014 B2
(45) Date of Patent: Jan. 4, 2022

(54) CIRCUITRY AND METHOD FOR DETECTING TEMPERATURE OF WIRELESS CHARGING COIL, AND STORAGE MEDIUM

(71) Applicant: BEIJING XIAOMI MOBILE SOFTWARE CO., LTD., Beijing (CN)

(72) Inventors: Chunjie Zhang, Beijing (CN); Hui Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 203 days.

(21) Appl. No.: 16/556,427

(22) Filed: Aug. 30, 2019

(65) Prior Publication Data
US 2020/0161892 A1    May 21, 2020

(30) Foreign Application Priority Data

Nov. 20, 2018    (CN) .......... 201811383288.X

(51) Int. Cl.
*H02J 7/00*    (2006.01)
*H02J 50/10*    (2016.01)
(Continued)

(52) U.S. Cl.
CPC ........ *H02J 7/007192* (2020.01); *H02J 7/025* (2013.01); *H02J 50/10* (2016.02);
(Continued)

(58) Field of Classification Search
CPC ...... H02J 7/007192; H02J 50/10; H02J 50/70; H02J 7/025; H04B 5/0037; H04B 5/0093; G01K 7/36; G01K 2217/00; G01K 7/16
See application file for complete search history.

(56) References Cited

U.S. PATENT DOCUMENTS

2013/0063160 A1*  3/2013  Nakano ............. H02J 50/60 324/653
2013/0336362 A1* 12/2013  Onishi ............. G01D 5/2013 374/184

(Continued)

FOREIGN PATENT DOCUMENTS

CN    103137383 A    6/2013
CN    107806943 A    3/2018
(Continued)

OTHER PUBLICATIONS

Zhang, C. et al. (CN 107806943 A) /Espacenet translation of the description of Zhang (Year: 2018).*

(Continued)

*Primary Examiner* — Stacy Whitmore
(74) *Attorney, Agent, or Firm* — Oblon, McClelland, Maier & Neustadt, L.L.P.

(57) ABSTRACT

The present disclosure relates to a circuitry and a method for detecting a temperature of a wireless charging coil, and a storage medium. The circuitry includes: a target resistor, a voltage supply circuit, a voltage detection circuit, and a processing component. The voltage supply circuit is configured to apply a target voltage to the series circuit. The voltage detection circuit is configured to obtain a first measured voltage across two ends of the wireless charging coil and a second measured voltage across two ends of the target resistor. The processing component is configured to: determine a working current of the series circuit based on the second measured voltage and a resistance of the target resistor; determine a real-time resistance of the wireless charging coil based on the first measured voltage and the working current; determine a real-time temperature of the wireless charging coil based on the real-time resistance.

18 Claims, 5 Drawing Sheets

(51) Int. Cl.
*H02J 50/70* (2016.01)
*H02J 7/02* (2016.01)
*H04B 5/00* (2006.01)

(52) U.S. Cl.
CPC ............ *H02J 50/70* (2016.02); *H04B 5/0037* (2013.01); *H04B 5/0093* (2013.01)

(56) References Cited

U.S. PATENT DOCUMENTS

| | | | |
|---|---|---|---|
| 2020/0200615 A1* | 6/2020 | Chen | G01K 15/005 |
| 2021/0138918 A1* | 5/2021 | Widmer | G01V 3/101 |

FOREIGN PATENT DOCUMENTS

| | | | | |
|---|---|---|---|---|
| EP | 0524466 A2 * | 1/1993 | | H02J 7/007192 |
| WO | WO-2004077000 A1 * | 9/2004 | | G01K 7/00 |
| WO | WO-2013060630 A1 * | 5/2013 | | F02D 41/20 |
| WO | WO-2015185931 A1 * | 12/2015 | | H03G 3/3005 |
| WO | WO-2016079524 A1 * | 5/2016 | | G01K 13/08 |

OTHER PUBLICATIONS

Combined Chinese Office Action and Search Report dated Feb. 3, 2021 in Chinese Patent Application No. 201811383288.X (with English translation of Office Action), 13 pages.
Extended European Search Report dated Mar. 16, 2020 in corresponding European Patent Application No. 19194625.0, 8 pages.

* cited by examiner

CIRCUITRY AND METHOD FOR DETECTING TEMPERATURE OF WIRELESS CHARGING COIL, AND STORAGE MEDIUM

CROSS-REFERENCE TO RELATED APPLICATIONS

This application is based on and claims priority to Chinese Patent Application No. 201811383288.X, filed on Nov. 20, 2018, the entire contents of which are incorporated herein by reference.

TECHNICAL FIELD

The present disclosure relates to a field of mobile terminal technology, and more particularly, to a circuitry, a method, and an apparatus for detecting a temperature of a wireless charging coil, and a storage medium.

BACKGROUND

With the rapid development of mobile terminal technology, wireless charging technology is applied more and more widely. According to the wireless charging technology, electrical energy may be radiated generally through a wireless charging coil. In an application process, as the wireless charging coil itself has resistance, a part of energy dissipated by the wireless charging coil may be converted into heat energy, thus, a temperature of the wireless charging coil is relatively high during a charging process. In order to ensure the working safety of the wireless charging coil, it is necessary to detect the temperature of the wireless charging coil.

A thermistor may be set near the wireless charging coil, and a voltage across two ends of the thermistor may be detected during a working process of the wireless charging coil. As the temperature of the wireless charging coil increases, a resistance of the thermistor decreases, so does the voltage across the two ends of the thermistor. Therefore, the temperature of the wireless charging coil may be detected according to the voltage.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a circuitry for detecting a temperature of a wireless charging coil. The circuitry includes a target resistor coupled to the wireless charging coil in series to form a series circuit; a voltage supply circuit coupled to the series circuit and configured to apply a target voltage to the series circuit during a charging process of the wireless charging coil; a voltage detection circuit coupled to the series circuit and configured to obtain a first measured voltage across two ends of the wireless charging coil and a second measured voltage across two ends of the target resistor when the target voltage is applied, the first measured voltage is a voltage generated by the target voltage across the two ends of the wireless charging coil, the second measured voltage is a voltage generated by the target voltage across the two ends of the target resistor; and a processing component coupled to the voltage detection circuit and configured to: determine a working current of the series circuit based on the second measured voltage and a resistance of the target resistor; determine a real-time resistance of the wireless charging coil based on the first measured voltage and the working current; and determine a real-time temperature of the wireless charging coil based on the real-time resistance of the wireless charging coil.

According to an aspect, the voltage detection circuit includes a first filter; a second filter; and an analog-digital converter (ADC) module, wherein the first filter is coupled to the wireless charging coil and the ADC module, and configured to filter a charging voltage of the wireless charging coil and output the first measured voltage across the two ends of the wireless charging coil when the target voltage is applied, the ADC module is configured to obtain the first measured voltage output by the first filter, and wherein the second filter is coupled to the target resistor and the ADC module, and configured to filter the charging voltage of the wireless charging coil and output the second measured voltage across the two ends of the target resistor when the target voltage is applied, the ADC module is further configured to obtain the second measured voltage output by the second filter.

According to another aspect, the voltage supply circuit includes a low-frequency signal generator configured to apply the target voltage to the series circuit during the charging process of the wireless charging coil, the target voltage is an alternating-current (AC) voltage with a frequency less than a preset frequency threshold.

According to yet another aspect, the processing component is further configured to determine the real-time temperature of the wireless charging coil based on the real-time resistance of the wireless charging coil, a standard resistance of the wireless charging coil detected when a temperature of the wireless charging coil is a standard temperature, and a temperature rise coefficient of the wireless charging coil, wherein the temperature rise coefficient is configured to indicate a correlation between a temperature change of the wireless charging coil and a resistance change of the wireless charging coil.

In an example, the processing component is configured to calculate the temperature T of the wireless charging coil by a formula of $$T = \frac{(R - R0)}{k} + T0;$$

wherein, R represents the real-time resistance, R0 represents the standard resistance, T0 represents the standard temperature, and k represents the temperature rise coefficient.

According to an aspect, the circuitry further includes a third filer coupled to the series circuit and configured to filter the target voltage and output the charging voltage.

Aspects of the disclosure also provide a method for detecting a temperature of a wireless charging coil. The method includes charging through the wireless charging coil; obtaining a real-time resistance of the wireless charging coil during a charging process; and determining a real-time temperature of the wireless charging coil based on the real-time resistance of the wireless charging coil.

According to an aspect, when determining the real-time temperature of the wireless charging coil, the method includes determining the real-time temperature of the wireless charging coil based on the real-time resistance of the wireless charging coil, a standard resistance of the wireless charging coil detected when a temperature of the wireless charging coil is a standard temperature, and a temperature rise coefficient of the wireless charging coil, wherein the temperature rise coefficient is configured to indicate a correlation between a temperature change of the wireless charging coil and a resistance change of the wireless charging coil.

According to another aspect, when determining the real-time temperature of the wireless charging coil, the method further includes calculating the temperature T of the wireless charging coil by a formula of:

$$T = \frac{(R - R0)}{k} + T0;$$

wherein, R represents the real-time resistance, R0 represents the standard resistance, T0 represents the standard temperature, and k represents the temperature rise coefficient.

According to yet another aspect, when obtaining the real-time resistance of the wireless charging coil during the charging process, the method includes applying a target voltage to a circuit where the wireless charging coil is located during the charging process; obtaining a first measured voltage across two ends of the wireless charging coil and a working current of the circuit when the target voltage is applied, the first measured voltage is a voltage generated by the target voltage across the two ends of the wireless charging coil; and determining the real-time resistance of the wireless charging coil based on the first measured voltage and the working current.

According to yet another aspect, when obtaining the working current of the circuit, the method further includes obtaining a second measured voltage across two ends of a target resistor in series with the wireless charging coil in the circuit, the second measured voltage is a voltage generated by the target voltage across the two ends of the target resistor; and determining the working current of the circuit based on the second measured voltage and a resistance of the target resistor.

In an example, the target voltage is an alternating-current (AC) voltage with a frequency less than a preset frequency threshold.

Aspects of the disclosure also provide a non-transitory computer-readable storage medium storing instructions, that, when executed by a processor, perform a method for detecting a temperature of a wireless charging coil. The method includes charging through the wireless charging coil; obtaining a real-time resistance of the wireless charging coil during a charging process; and determining a real-time temperature of the wireless charging coil based on the real-time resistance of the wireless charging coil.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this specification, illustrate aspects consistent with the present disclosure and, together with the description, serve to explain the principles of the present disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of exemplary aspects do not represent all implementations consistent with the present disclosure. Instead, they are merely examples of apparatuses and methods consistent with aspects related to the present disclosure as recited in the appended claims.

Firstly, scenarios involved in the present disclosure are briefly introduced.

In the process of charging with the wireless charging coil, the temperature of the wireless charging coil will increase as the charging duration increases, because the wireless charging coil itself has resistance. In addition, due to the low efficiency of the actual application of the wireless charging coil, most of energy dissipated is converted into heat energy in the wireless charging coil. To sum up, in order to ensure the safety of wireless charging, it is necessary to test the temperature of the wireless charging coil.

At present, in order to detect the temperature of the wireless charging coil, a thermistor is usually added near the wireless charging coil to detect the temperature of the wireless charging coil by detecting a voltage across two ends of the thermistor. However, as the wireless charging coil has a certain area, and the thermistor may only be arranged near a local point of the wireless charging coil, there is a difference between the temperature measured by the thermistor and the actual temperature of the wireless charging coil. That is, the temperature detection is not accurate.

For this purpose, aspects of the present disclosure provide a circuitry and a method for detecting the temperature of the wireless charging coil, which may accurately measure the real-time temperature of the wireless charging coil. The specific implementation process is shown in the following aspects.

Figure 1:
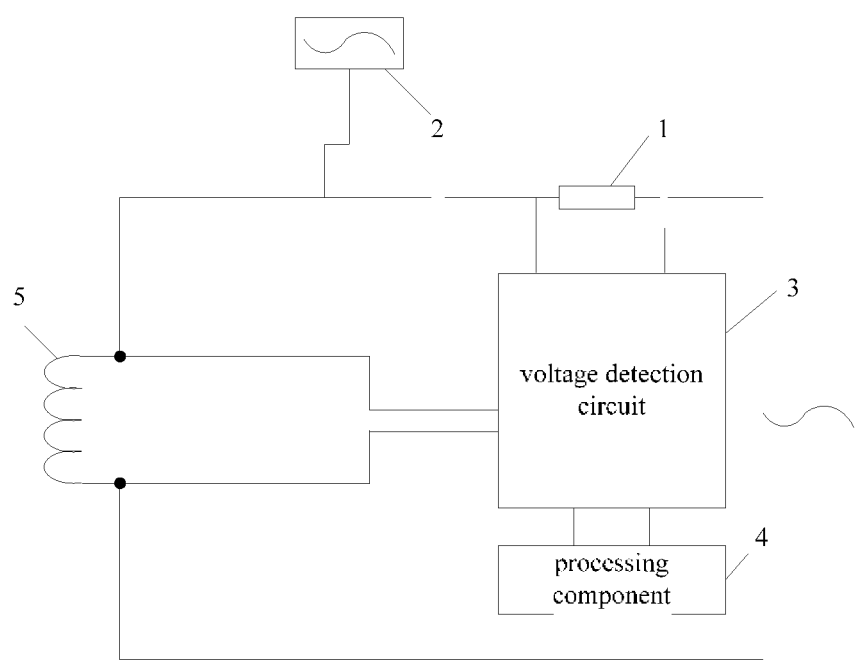
FIG. 1 is a schematic diagram illustrating a circuitry for detecting a temperature of a wireless charging coil according to an exemplary aspect of the present disclosure.

In order to realize a temperature detection of the wireless charging coil, aspects of the present disclosure provide a circuitry for detecting the temperature. Referring to FIG. 1, FIG. 1 is a schematic diagram illustrating a circuitry for detecting the temperature according to an exemplary aspect. The circuitry for detecting the temperature mainly includes: a target resistor 1, a voltage supply circuit 2, a voltage detection circuit 3, and a processing component 4.

The target resistor 1 and the wireless charging coil 5 are coupled in series to form a series circuit. The voltage supply circuit 2 is coupled to the series circuit and configured to apply a target voltage to the series circuit during a charging process of the wireless charging coil 5. The voltage detection circuit 3 is coupled to the series circuit and configured to obtain a first measured voltage across two ends of the wireless charging coil 5 and a second measured voltage across two ends of the target resistor 1 when the target voltage is applied. The first measured voltage is a voltage generated by the target voltage across the two ends of the wireless charging coil 5. The second measured voltage is a voltage generated by the target voltage across the two ends of the target resistor 1. The processing component 4 is coupled to the voltage detection circuit 3 and configured to: determine a working current of the series circuit according to the second measured voltage and a resistance of the target resistor 1; determine a real-time resistance of the wireless charging coil 5 according to the first measured voltage and the working current; determine a real-time temperature of the wireless charging coil 5 according to the real-time resistance of the wireless charging coil 5.

For the wireless charging coil 5, it is difficult to determine its direct current (DC) resistance, i.e., the real-time resistance directly during the charging process due to the constant change of its resistance. In aspects of the present disclosure, the DC resistance of the wireless charging coil may be simulated by an extremely-low-frequency impedance, that is, the target voltage is applied here by the voltage supply circuit 2 to the circuit where the wireless charging coil 5 is located. The target voltage is an alternating-current (AC) voltage with a frequency less than a preset frequency threshold. That is, the frequency of the target voltage may be considered to be close to the voltage frequency corresponding to the DC resistance of the wireless charging coil 5. Therefore, the real-time resistance of the wireless charging coil 5 may be determined based on the target voltage.

Further, the voltage supply circuit 2 may include a low-frequency signal generator. The low-frequency signal generator is configured to apply the target voltage to the series circuit during the charging process of the wireless charging coil 5.

In one possible implementation, the target voltage may be set to 40 Hz. At this point, it may be considered that 40 Hz is close to the voltage frequency corresponding to the DC resistance of the wireless charging coil 5. Therefore, the real-time resistance of the wireless charging coil 5 may be determined based on the target voltage of 40 Hz subsequently.

The above preset frequency threshold may be customized by a user according to the actual needs, and may also be set by default by the above circuitry for detecting the temperature, which is not limited in aspects of the present disclosure.

In the implementation process, after the voltage supply circuit 2 applies the target voltage to the circuit, the measured voltage generated by the target voltage across the two ends of the wireless charging coil 5 may be different from the target voltage due to some characteristics of the wireless charging coil 5 or the circuit itself. Thus, in order to accurately determine the real-time resistance based on the applied target voltage, the first measured voltage generated by the target voltage across the two ends of the wireless charging coil 5 should be obtained by the voltage detection circuit 3.

In addition, the processing component 4 obtains the working current of the circuit where the wireless charging coil 5 is located, thus, according to the first measured voltage and the working current, the real-time resistance of the wireless charging coil 5 may be determined by ohm's law.

The realization process of obtaining the working current of the circuit includes the following. The second measured voltage across the two ends of the target resistor 1 in series with the wireless charging coil 5 is obtained by the voltage detection circuit 3. The second measured voltage is the voltage generated by the target voltage across the two ends of the target resistor 1. The working current of the circuit is determined by the processing component 4 according to the second measured voltage and the resistance of the target resistor 1.

In other words, the working current in the circuit may be determined by obtaining the second measured voltage across the two ends of the target resistor 1 in series with the wireless charging coil 5. Similar to the first measured voltage mentioned above, the second measured voltage is generated by the target voltage across the two ends of the target resistor 1.

A precision resistor with a known resistance is selected as the target resistor. In some aspects, of course, the target resistor may also be an ordinary resistor, which is not limited in aspects of the present disclosure.

Figure 2:
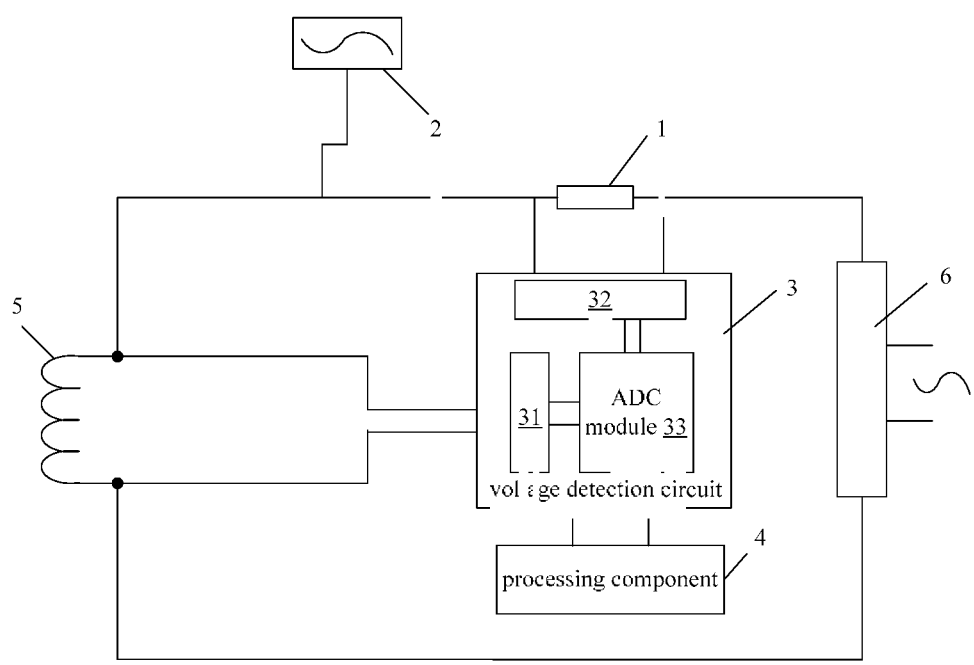
FIG. 2 is a schematic diagram illustrating a circuitry for detecting a temperature of a wireless charging coil according to an exemplary aspect of the present disclosure.

Further, referring to FIG. 2, the voltage detection circuit 3 includes: a first filter 31, a second filter 32, and an analog-digital converter (ADC) module 33. The first filter 31 is coupled to the wireless charging coil 5 and the ADC module 33, and configured to filter a charging voltage of the wireless charging coil 5 and output the first measured voltage across the two ends of the wireless charging coil 5 when the target voltage is applied. The ADC module 33 is configured to obtain the first measured voltage output by the first filter 31. The second filter 32 is coupled to the target resistor 1 and the ADC module 33, and configured to filter the charging voltage of the wireless charging coil 5 and output the second measured voltage across the two ends of the target resistor 1 when the target voltage is applied. The ADC module 33 is further configured to obtain the second measured voltage output by the second filter 32.

In some aspects, the first filter 31 and the second filter 32 are low-pass filters. Alternatively, the first filter 31 and the second filter 32 may both be other filters capable of filtering out the charging voltage and outputting the target voltage, which is not limited in aspects of the present disclosure.

After determining the real-time resistance of the wireless charging coil 5, the processing component 4 is configured to: determine the real-time temperature of the wireless charging coil 5 according to the real-time resistance of the wireless charging coil 5, a standard resistance of the wireless charging coil 5 detected when a temperature of the wireless charging coil 5 is a standard temperature, and a temperature rise coefficient of the wireless charging coil 5.

The temperature rise coefficient is configured to indicate a correlation between a temperature change of the wireless charging coil 5 and a resistance change of the wireless charging coil 5.

In one possible implementation, the standard temperature could be 20 degrees. That is, the standard resistance corresponding to the temperature of the wireless charging coil 5 at 20 degrees may be measured before the method for detecting the temperature of the wireless charging coil 5 is implemented.

Further, the processing component 4, according to the real-time resistance of the wireless charging coil 5, the standard resistance of the wireless charging coil 5 detected when the temperature of the wireless charging coil 5 is the standard temperature, and the temperature rise coefficient of the wireless charging coil 5, is configured to calculate the temperature T of the wireless charging coil 5 by a formula of:

$$T = \frac{(R - R0)}{k} + T0;$$

in which, R represents the real-time resistance, R0 represents the standard resistance, T0 represents the standard temperature, and k represents the temperature rise coefficient.

Further, referring to FIG. 2, the circuity for detecting the temperature may further include a third filter 6. The third filter 6 is coupled to the series circuit and configured to filter the target voltage and output the charging voltage, for example, the third filter 6 may be a high-pass filter. In other words, in order to avoid the effect of the applied target voltage on charging, the third filter 6 may be configured in the circuity for detecting the temperature to filter the target voltage through the third filter 6.

In aspects of the present disclosure, the voltage supply circuit applies the target voltage to the circuit where the wireless charging coil is located during the charging process. The voltage detection circuit obtains the first measured voltage generated across the two ends of the wireless charging coil by the target voltage and the second measured voltage generated across the two ends of the target resistor in series with the wireless charging coil by the target voltage. The processing component determines the working current of the circuit where the wireless charging coil is located according to the second measured voltage and the resistance of the target resistor, then determines the real-time resistance of the wireless charging coil according to the first measured voltage and the working current. In this way, the processing component may determine the real-time temperature of the wireless charging coil according to the determined real-time resistance. Since the aspects of the present disclosure may determine an actual temperature of the wireless charging coil, rather than a nearby temperature, thus, the accuracy of temperature detection is improved.

Figure 3:
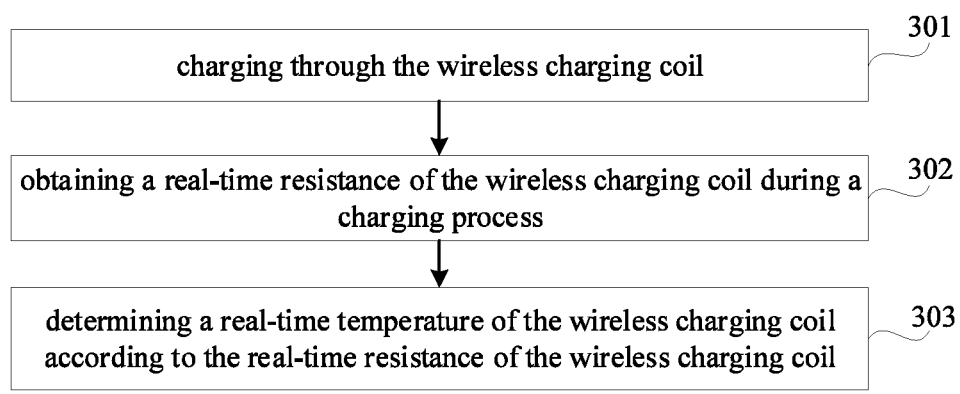
FIG. 3 is a flow chart illustrating a method for detecting a temperature of a wireless charging coil according to an exemplary aspect of the present disclosure.

FIG. 3 is a flow chart illustrating a method for detecting a temperature of a wireless charging coil according to an exemplary aspect. As illustrated in FIG. 3, the method for detecting the temperature of the wireless charging coil is applied to the above circuitry, which may include the acts in the following blocks.

At block 301, it is charged through the wireless charging coil.

In some aspects, the wireless charging coil may be configured in a terminal or an intelligent charging device. That is, this method may be used to detect the temperature of the wireless charging coil in the terminal, and also to detect the temperature of the wireless charging coil in the intelligent charging device, which is not limited in aspects of the present disclosure.

At block 302, a real-time resistance of the wireless charging coil is obtained during a charging process.

In one possible implementation, the realization of obtaining the real-time resistance of the wireless charging coil during the charging process may include the following. A target voltage is applied to the circuit where the wireless charging coil is located during the charging process. When the target voltage is applied, a first measured voltage across two ends of the wireless charging coil and a working current of the circuit are obtained. The first measured voltage is a voltage generated by the target voltage across the two ends of the wireless charging coil. According to the first measured voltage and the working current, the real-time resistance of the wireless charging coil is determined.

For the wireless charging coil, it is difficult to determine its real-time resistance directly during the charging process due to the constant change of the resistance. In aspects of the present disclosure, the DC resistance of the wireless charging coil may be simulated by an extremely-low-frequency impedance, that is, the target voltage is applied here to the circuit where the wireless charging coil is located. The target voltage is an AC voltage with a frequency less than a preset frequency threshold. That is, the frequency of the target voltage may be considered to be close to the voltage frequency corresponding to the DC resistance of the wireless charging coil. Therefore, the real-time resistance of the wireless charging coil may be determined based on the target voltage.

The above preset frequency threshold may be customized by the user according to the actual needs, and may also be set by default by the above the circuity for detecting the temperature, which is not limited in aspects of the present disclosure.

In one possible implementation, the target voltage may be set to 40 Hz. At this point, it may be considered that 40 Hz is close to the voltage frequency corresponding to the DC resistance of the wireless charging coil. Therefore, the real-time resistance of the wireless charging coil may be determined based on the target voltage of 40 Hz subsequently.

In the implementation process, after the target voltage is applied to the circuit, the measured voltage generated by the target voltage across the two ends of the wireless charging coil may be different from the target voltage due to some characteristics of the wireless charging coil or the circuit itself. Thus, in order to accurately determine the real-time resistance based on the applied target voltage, the first measured voltage generated by the target voltage across the two ends of the wireless charging coil should be obtained.

For example, referring to FIG. 2 above, the specific implementation of obtaining the first measured voltage across the two ends of the wireless charging coil may include the following. A second filter is coupled between the wireless charging coil and the ADC module configured to read the first measured voltage across the two ends of the wireless charging coil. The second filter is configured to filter the charging voltage and output the first measured voltage across the two ends of the wireless charging coil. Thus, the first measured voltage across the two ends of the wireless charging coil may be obtained through the ADC module.

In addition, the working current of the circuit where the wireless charging coil is located is obtained, thus, according to the first measured voltage and the working current, the real-time resistance of the wireless charging coil may be determined by ohm's law.

In addition, in a possible implementation, acquiring the working current of the circuit includes the following. A second measured voltage across two ends of a target resistor in series with the wireless charging coil in the circuit is obtained. The second measured voltage is a voltage generated by the target voltage across the two ends of the target resistor. The working current of the circuit is determined according to the second measured voltage and the resistance of the target resistor.

In aspects of the present disclosure, the working current in the circuit may be obtained according to the target resistor. In some aspects, a precision resistor with a known resistance may be selected as the target resistor.

Referring to FIG. 2, the working current in the circuit here may be determined by obtaining the second measured voltage across the two ends of the target resistor in series with the wireless charging coil. Similar to the first measured voltage mentioned above, the second measured voltage is generated by the target voltage across the two ends of the target resistor. In the implementation process, a first filter may be coupled between the target resistor and the ADC module configured to read the second measured voltage across the two ends of the target resistor. The first filter may be configured to filter the charging voltage and output the second measured voltage across the two ends of the target resistor. Thus, the second measured voltage across the two ends of the target resistor may be obtained through the ADC module. Then, according to the second measured voltage and the resistance of the target resistor, the working current through the target resistor may be determined by ohm's law, that is, the working current of the circuit where the wireless charging coil is located may be determined.

Of course, it should be noted that, the above-mentioned target resistor as a precision resistor is only to illustrate. In another aspect, the target resistor may also be an ordinary resistor, which is not limited in aspects of the present disclosure.

At block 303, the real-time temperature of the wireless charging coil is determined according to the real-time resistance of the wireless charging coil.

In one possible implementation, the specific implementation of block 303 may include the following. The real-time temperature of the wireless charging coil is determined according to the real-time resistance of the wireless charging coil, a standard resistance of the wireless charging coil detected when a temperature of the wireless charging coil is a standard temperature, and a temperature rise coefficient of the wireless charging coil.

The temperature rise coefficient is configured to indicate a correlation between a temperature change of the wireless charging coil and a resistance change of the wireless charging coil.

In one possible implementation, the standard temperature could be 20 degrees. That is, the standard resistance corresponding to the temperature of the wireless charging coil at 20 degrees may be measured before the method for detecting the temperature of the wireless charging coil is implemented.

Further, according to the real-time resistance of the wireless charging coil, the standard resistance of the wireless charging coil detected when the temperature of the wireless charging coil is the standard temperature, and the temperature rise coefficient of the wireless charging coil, the temperature T of the wireless charging coil is calculated by a formula of:

$$T = \frac{(R - R0)}{k} + T0;$$

in which, R represents the real-time resistance, R0 represents the standard resistance, T0 represents the standard temperature, and k represents the temperature rise coefficient.

In aspects of the present disclosure, the voltage supply circuit applies the target voltage to the circuit where the wireless charging coil is located during the charging process. The voltage detection circuit obtains the first measured voltage generated across the two ends of the wireless charging coil by the target voltage and the second measured voltage generated across the two ends of the target resistor in series with the wireless charging coil by the target voltage. The processing component determines the working current of the circuit where the wireless charging coil is located according to the second measured voltage and the resistance of the target resistor, then determines the real-time resistance of the wireless charging coil according to the first measured voltage and the working current. In this way, the processing component may determine the real-time temperature of the wireless charging coil according to the determined real-time resistance. Since the aspects of the present disclosure may determine an actual temperature of the wireless charging coil, rather than a nearby temperature, thus, the accuracy of temperature detection is improved.

The following is aspects of an apparatus of the present disclosure, which may be used to implement aspects of the method of the present disclosure. For details not disclosed in aspects of the apparatus of the present disclosure, please refer to aspects of the method of the present disclosure.

Figure 4:
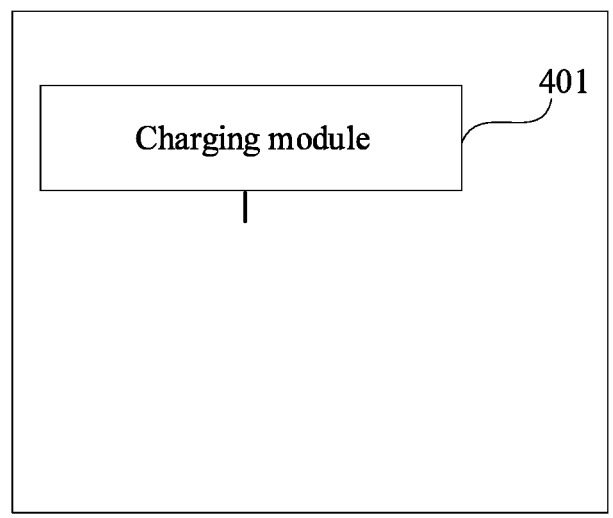
FIG. 4 is a block diagram illustrating an apparatus for detecting a temperature of a wireless charging coil according to an exemplary aspect of the present disclosure.

FIG. 4 is a block diagram illustrating an apparatus for detecting a temperature of a wireless charging coil according to an exemplary aspect. The apparatus has functions of implementing the above example of the method. The functions may be implemented by hardware or by executing corresponding software via the hardware. Referring to FIG. 4, the apparatus may include a charging module 401, an obtaining module 402, and a determining module 403.

The charging module 401 is configured to charge through the wireless charging coil.

The obtaining module 402 is configured to obtain a real-time resistance of the wireless charging coil during a charging process.

The determining module 403 is configured to determine a real-time temperature of the wireless charging coil according to the real-time resistance of the wireless charging coil.

Alternatively, the determining module 403 includes: a first determining submodule.

The first determining submodule is configured to determine the real-time temperature of the wireless charging coil according to the real-time resistance of the wireless charging coil, a standard resistance of the wireless charging coil detected when a temperature of the wireless charging coil is a standard temperature, and a temperature rise coefficient of the wireless charging coil.

The temperature rise coefficient is configured to indicate a correlation between a temperature change of the wireless charging coil and a resistance change of the wireless charging coil.

Alternatively, the first determining submodule is configured to: calculate the temperature T of the wireless charging coil by a formula of:

$$T = \frac{(R - R0)}{k} + T0;$$

in which, R represents the real-time resistance, R0 represents the standard resistance, T0 represents the standard temperature, and k represents the temperature rise coefficient.

Alternatively, the obtaining module 402 is configured to: an applying submodule, an obtaining submodule, and a second determining submodule.

The applying submodule is configured to apply a target voltage to a circuit where the wireless charging coil is located during the charging process.

The obtaining submodule is configured to obtain a first measured voltage across two ends of the wireless charging coil and a working current of the circuit when the target voltage is applied. The first measured voltage is a voltage generated by the target voltage across the two ends of the wireless charging coil.

The second determining submodule is configured to determine the real-time resistance of the wireless charging coil according to the first measured voltage and the working current.

Alternatively, the obtaining submodule is configured to: obtain a second measured voltage across two ends of a target resistor in series with the wireless charging coil in the circuit, the second measured voltage is a voltage generated by the target voltage across the two ends of the target resistance; and determine the working current of the circuit according to the second measured voltage and the resistance of the target resistor.

Alternatively, the target voltage is an alternating-current (AC) voltage with a frequency less than a preset frequency threshold.

In aspects of the present disclosure, the voltage supply circuit applies the target voltage to the circuit where the wireless charging coil is located during the charging process. The voltage detection circuit obtains the first measured voltage generated across the two ends of the wireless charging coil by the target voltage and the second measured voltage generated across the two ends of the target resistor in series with the wireless charging coil by the target voltage. The processing component determines the working current of the circuit where the wireless charging coil is located according to the second measured voltage and the resistance of the target resistor, then determines the real-time resistance of the wireless charging coil according to the first measured voltage and the working current. In this way, the processing component may determine the real-time temperature of the wireless charging coil according to the determined real-time resistance. Since the aspects of the present disclosure may determine an actual temperature of the wireless charging coil, rather than a nearby temperature, thus, the accuracy of temperature detection is improved.

It should be explained that, when the apparatus provided by the above aspects realizes its functions, it is only illustrated by the division of each function module mentioned above. The content structure of the apparatus is divided into different functional modules to complete all or part of the functions described above.

With regard to the apparatus in the above aspects, the specific mode of operation of each module has been described in detail in the aspects of the method, which will not be elaborated here.

Figure 5:
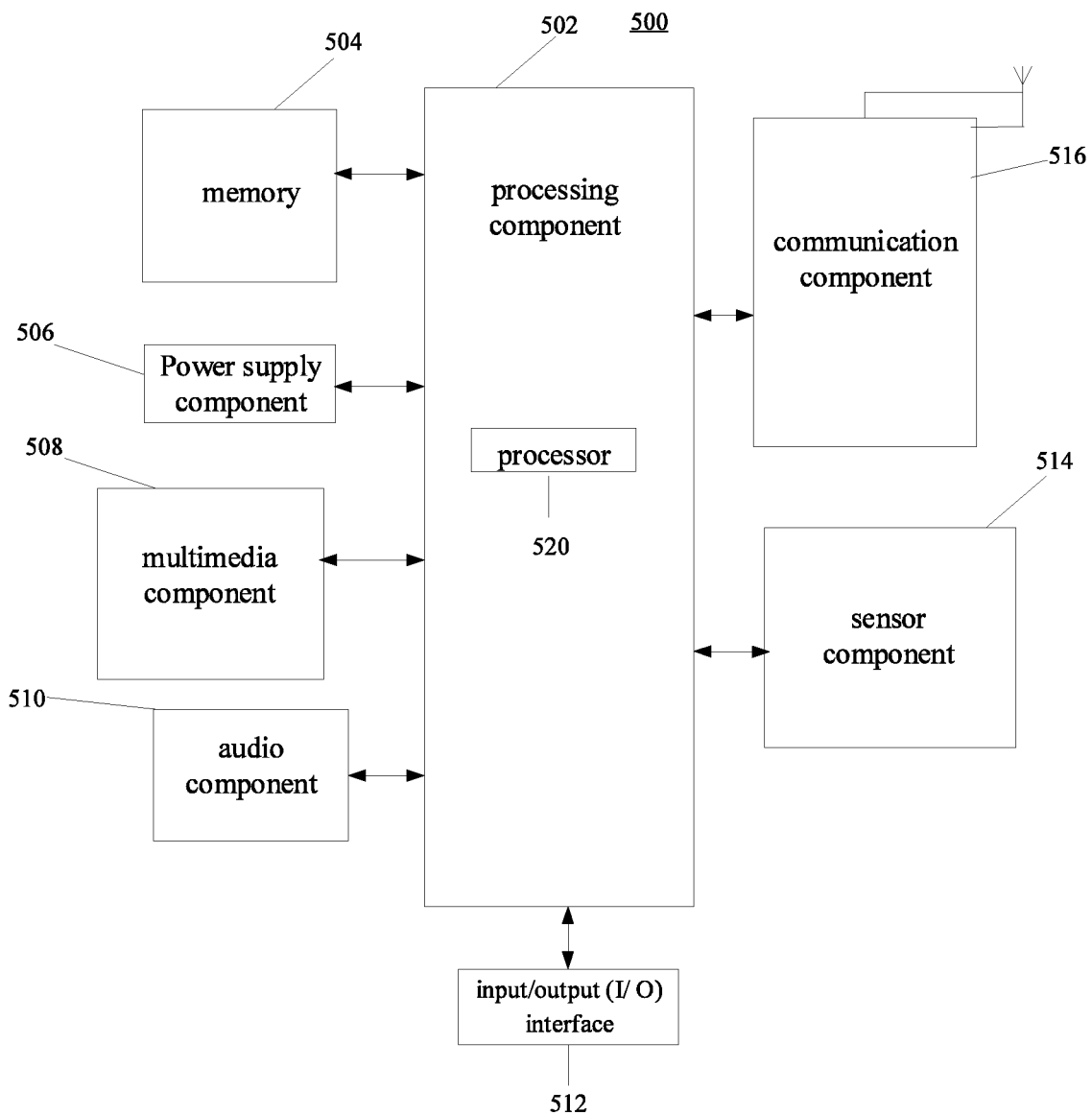
FIG. 5 is a block diagram illustrating an apparatus for detecting a temperature of a wireless charging coil according to an exemplary aspect of the present disclosure.

FIG. 5 is a block diagram illustrating an apparatus 500 for detecting a temperature of a wireless charging coil according to an exemplary aspect. For example, the apparatus 500 may be a mobile phone, a computer, a digital broadcast terminal, a messaging device, a game console, a tablet device, a medical device, a fitness device, a personal digital assistant, and the like.

Referring to FIG. 5, the apparatus 500 may include one or more of the following components: a processing component 502, a memory 504, a power supply component 506, a multimedia component 508, an audio component 510, an input/output (I/O) interface 512, a sensor component 514, and a communication component 516.

The processing component 502 usually controls the overall operation of the apparatus 500, such as operations associated with a display, telephone calls, data communications, camera operations, and recording operations. The processing component 502 may include one or more processors 520 to execute instructions to complete all or part of the steps of the method described above. In addition, the processing component 502 may include one or more modules to facilitate processing of interactions between the processing component 502 and other components. For example, the processing component 502 may include a multimedia module to facilitate interaction between the multimedia component 508 and the processing component 502.

The memory 504 is configured to store various types of data to support operations in the apparatus 500. Examples of the data include instructions for any application or method that operates on the device 500, contact data, phonebook data, messages, pictures, videos, and the like. The memory 504 may be implemented by any type of volatile or non-volatile storage device or a combination thereof, such as s static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or CD-ROM.

The power supply component 506 provides power to various components of the apparatus 500. The power supply component 506 may include a power management system, one or more power supplies, and other components associated with generating, managing, and distributing power supplies for the apparatus 500.

The multimedia component 508 includes a screen providing an output interface between the apparatus 500 and the user. In some aspects, the screen may include a liquid crystal display (LCD) and a touch panel (TP). If the screen includes a TP, the screen may be implemented as a touch screen to receive input signals from the user. The TP includes one or more touch sensors to sense touch, swipe, and gestures on the TP. The touch sensor may not only sense the boundary of a touch or sliding motion, but also detect the duration and pressure related to the touch or slide operation. In some aspects, the multimedia component 508 includes a front-facing camera and/or a rear-facing camera. When the apparatus 500 is in an operation mode, such as a shooting mode or a video mode, the front camera and/or the rear camera may receive external multimedia data. Each front-facing camera and rear-facing camera may be a fixed optical lens system or have a focal length and an optical zoom capability.

The audio component 510 is configured to output and/or input audio signals. For example, the audio component 510 includes a microphone (MIC). When the apparatus 500 is in the operation mode, such as a call mode, a record mode, and a voice recognition mode, the MIC is configured to receive external audio signals. The received audio signals may be further stored in the memory 504 or sent via the communication component 516. In some aspects, the audio component 510 further includes a speaker for outputting audio signals.

The I/O interface 512 provides an interface between the processing component 502 and a peripheral interface module, the peripheral interface module may be a keyboard, a click wheel, a button, and the like. These buttons may include, but are not limited to: a home button, a volume button, a start button, and a lock button.

The sensor component 514 includes one or more sensors, configured to provide various aspects of a state assessment for the apparatus 500. For example, the sensor component 514 may detect an open/closed state of the apparatus 500, and a relative positioning of the components, such as a display and a keypad of the apparatus 500; the sensor component 514 may further detect a change in a position of the apparatus 500 or a component of the apparatus 500, the presence or absence of a contact between the user and the apparatus 500, the position or an acceleration/deceleration of the apparatus 500 and the temperature change of the apparatus 500. The sensor component 514 may include a proximity sensor configured to detect the presence of nearby objects in the absence of any physical contact. The sensor component 514 may further include an optical sensor, such as a CMOS or a CCD image sensor, for use in an imaging application. In some aspects, the sensor component 514 may also include an acceleration sensor, a gyroscope sensor, a magnetic sensor, a pressure sensor, or a temperature sensor.

The communication component 516 is configured to facilitate a wired or a wireless communication between the apparatus 500 and other devices. The apparatus 500 may access a wireless network based on communication standards, such as WIFI, 2G or 3G, or a combination of them. In an exemplary aspect, the communication component 516 receives a broadcast signal or broadcast-related information from an external broadcast management system via a broadcast channel. In an exemplary aspect, the communication component 516 further includes a near field communication (NFC) module to facilitate a short-range communication. For example, a NFC module may be implemented based on a radio frequency identification (RFID) technology, an infrared data association (IrDA) technology, an ultra-wideband (UWB) technology, a Bluetooth (BT) technology and other technologies.

In exemplary aspects, the apparatus 500 may be implemented by one or more application specific integrated circuits (ASIC), digital signal processors (DSP), digital signal processing equipments (DSPD), programmable logic devices (PLD) and field programmable gate arrays (FPGA), controllers, microcontrollers, microprocessors and other electronic components, and configured to execute the method according to the aspect in FIG. 3.

In exemplary aspects, a non-transitory computer-readable storage medium including instructions is further provided, for example, the memory 504 including instructions. The above instructions may be executed by the processor 520 of the apparatus 500 to complete the above method. For example, the non-transitory computer-readable storage medium may be a ROM, a random-access memory (RAM), a CD-ROM, a magnetic tape, a floppy disk, and an optical data storage equipment, and the like.

A non-transitory computer-readable storage medium enables a mobile terminal to perform the method for detecting the temperature of the wireless charging coil when instructions in the storage medium are executed by a processor of the mobile terminal.

A computer program product including instructions, when running on a computer, causes the computer to perform the method for detecting the temperature of the wireless charging coil.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as illustrative only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A circuitry for detecting a temperature of a wireless charging coil, comprising:
   a target resistor coupled to the wireless charging coil in series to form a series circuit;
   a voltage supply circuit coupled to the series circuit and configured to apply a target voltage to the series circuit during a charging process of the wireless charging coil, wherein the voltage supply circuit comprises: a low-frequency siunal generator configured to apply the target voltage to the series circuit during the charging process of the wireless charging coil, the target voltage is an alternating-current (AC) voltage with a frequency less than a preset frequency threshold;
   a voltage detection circuit coupled to the series circuit and configured to obtain a first measured voltage across two ends of the wireless charging coil and a second measured voltage across two ends of the target resistor when the target voltage is applied, the first measured voltage is a voltage generated by the target voltage across the two ends of the wireless charging coil, the second measured voltage is a voltage generated by the target voltage across the two ends of the target resistor; and
   a processing component coupled to the voltage detection circuit and configured to:
      determine a working current of the series circuit based on the second measured voltage and a resistance of the target resistor;
      determine a real-time resistance of the wireless charging coil based on the first measured voltage and the working current; and
      determine a real-time temperature of the wireless charging coil based on the real-time resistance of the wireless charging coil.

2. The circuitry of claim 1, wherein the voltage detection circuit comprises:
   a first filter;
   a second filter; and an analog-digital converter (ADC) module,
wherein the first filter is coupled to the wireless charging coil and the ADC module, and configured to filter a charging voltage of the wireless charging coil and output the first measured voltage across the two ends of the wireless charging coil when the target voltage is applied, the ADC module is configured to obtain the first measured voltage output by the first filter, and
wherein the second filter is coupled to the target resistor and the ADC module, and configured to filter the charging voltage of the wireless charging coil and output the second measured voltage across the two ends of the target resistor when the target voltage is applied, the ADC module is further configured to obtain the second measured voltage output by the second filter.

3. The circuitry of claim 1, wherein the target voltage is the alternating-current (AC) voltage with 40 MHz.

4. The circuitry of claim 1, wherein the processing component is further configured to:
determine the real-time temperature of the wireless charging coil based on the real-time resistance of the wireless charging coil, a standard resistance of the wireless charging coil detected when a temperature of the wireless charging coil is a standard temperature, and a temperature rise coefficient of the wireless charging coil,
wherein the temperature rise coefficient is configured to indicate a correlation between a temperature change of the wireless charging coil and a resistance change of the wireless charging coil.

5. The circuitry of claim 4, wherein the processing component is further configured to:
calculate the temperature T of the wireless charging coil by a formula of:

$$T = \frac{(R - R0)}{k} + T0;$$

wherein, R represents the real-time resistance, R0 represents the standard resistance, T0 represents the standard temperature, and k represents the temperature rise coefficient.

6. The circuitry of claim 2, further comprising:
a third coupled to the series circuit and configured to filter the target voltage and output the charging voltage.

7. A method for detecting a temperature of a wireless charging coil, comprising:
charging through the wireless charging coil;
applying a target voltage to a circuit where the wireless charging coil is located during the charging process, wherein the target voltage is an alternating-current (AC) voltage with a frequency less than a preset frequency threshold:
obtaining a real-time resistance of the wireless charging coil during a charging process; and
determining a real-time temperature of the wireless charging coil based on the real-time resistance of the wireless charging coil.

8. The method of claim 7, wherein determining the real-time temperature of the wireless charging coil comprises:
determining the real-time temperature of the wireless charging coil based on the real-time resistance of the wireless charging coil, a standard resistance of the wireless charging coil detected when a temperature of the wireless charging coil is a standard temperature, and a temperature rise coefficient of the wireless charging coil,
wherein the temperature rise coefficient is configured to indicate a correlation between a temperature change of the wireless charging coil and a resistance change of the wireless charging coil.

9. The method of claim 8, wherein determining the real-time temperature of the wireless charging coil further comprises:
calculating the temperature T of the wireless charging coil by a formula of:

$$T = \frac{(R - R0)}{k} + T0;$$

wherein, R represents the real-time resistance, R0 represents the standard resistance, T0 represents the standard temperature, and k represents the temperature rise coefficient.

10. The method of claim 7, wherein obtaining the real-time resistance of the wireless charging coil during the charging process comprises:
obtaining a first measured voltage across two ends of the wireless charging coil and a working current of the circuit when the target voltage is applied, the first measured voltage is a voltage generated by the target voltage across the two ends of the wireless charging coil; and
determining the real-time resistance of the wireless charging coil based on the first measured voltage and the working current.

11. The tnethod of claim 10, wherein obtaining the working current of the circuit further comprises:
obtaining a second measured voltage across two ends of a target resistor in series with the wireless charging coil in the circuit, the second measured voltage is a voltage generated by the target voltage across the two ends of the target resistor; and
determining the working current of the circuit based on the second measured voltage and a resistance of the target resistor.

12. The method of claim 10, wherein the target voltage is the alternating-current (AC) voltage with 40 Hz.

13. A non-transitory computer-readable storage medium storing instructions, that, when executed by a processor, perform a method for detecting a temperature of a wireless charging coil, the method comprising:
charging through the wireless charging coil;
applying a target voltage to a circuit where the wireless charging coil is located during the charging process; wherein the target voltage is an alternating-current (AC) voltage with a frequency less than a preset frequency threshold;
obtaining a real-time resistance of the wireless charging coil during a charging process; and
determining a real-time temperature of the wireless charging coil based on the real-time resistance of the wireless charging coil.

14. The non-transitory computer-readable storage medium of claim 13, wherein determining the real-time temperature of the wireless charging coil comprises:
determining the real-time temperature of the wireless charging coil based on the real-time resistance of the wireless charging coil, a standard resistance of the wireless charging coil detected when a temperature of the wireless charging coil is a standard temperature, and a temperature rise coefficient of the wireless charging coil;

wherein the temperature rise coefficient is configured to indicate a correlation between a temperature change of the wireless charging coil and a resistance change of the wireless charging coil.

15. The non-transitory computer-readable storage medium of claim 14, wherein determining the real-time temperature of the wireless charging coil further comprises:
calculating the temperature T of the wireless charging coil by a formula of:

$$T = \frac{(R - R0)}{k} + T0;$$

wherein, R represents the real-time resistance, R0 represents the standard resistance, T0 represents the standard temperature, and k represents the temperature rise coefficient.

16. The non-transitory computer-readable storage medium of claim 13, wherein obtaining the real-time resistance of the wireless charging coil during the charging process comprises:

obtaining a first measured voltage across two ends of the wireless charging coil and a working current of the circuit when the target voltage is applied, the first measured voltage is a voltage generated by the target voltage across the two ends of the wireless charging coil; and determining the real-time resistance of the wireless charging coil based on the first measured voltage and the working current.

17. The non-transitory computer-readable storage medium of claim 16, wherein obtaining the working current of the circuit comprises:

obtaining a second measured voltage across two ends of a target resistor in series with the wireless charging coil in the circuit, the second measured voltage is a voltage generated by the target voltage across the two ends of the target resistor; and determining the working current of the circuit based on the second measured voltage and a resistance of the target resistor.

18. The non-transitory computer-readable storage medium of claim 16, wherein the target voltage is -the alternating-current (AC) voltage with 40 Hz.

* * * * *